United States Patent
Koro et al.

(10) Patent No.: US 6,868,811 B2
(45) Date of Patent: Mar. 22, 2005

(54) FRAMELESS VARIABLE VALVE ACTUATION MECHANISM

(75) Inventors: Fuat Koro, Rochester, NY (US); Ronald J. Pierik, Rochester, NY (US); Thomas H. Fischer, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/460,806

(22) Filed: Jun. 12, 2003

(65) Prior Publication Data

US 2004/0020454 A1 Feb. 5, 2004

Related U.S. Application Data

(60) Provisional application No. 60/388,531, filed on Jun. 13, 2002.

(51) Int. Cl.[7] .................................................. F01L 1/34
(52) U.S. Cl. ............................... 123/90.16; 123/90.15; 123/90.39; 74/53
(58) Field of Search ........................... 123/90.15–90.18, 123/90.24–90.27, 90.39–90.47, 90.6, 90.65–90.67; 74/53–55, 595–598

(56) References Cited

U.S. PATENT DOCUMENTS

| | | | | |
|---|---|---|---|---|
| 3,192,755 A | * | 7/1965 | Laxo | ........................... 72/156 |
| 6,019,076 A | | 2/2000 | Pierik et al. | |
| 6,123,053 A | | 9/2000 | Hara et al. | |
| 6,131,545 A | * | 10/2000 | Kreuter | .................. 123/198 F |
| 6,422,188 B2 | | 7/2002 | Pierik | |
| 6,439,177 B2 | | 8/2002 | Pierik | |
| 6,532,924 B1 | | 3/2003 | Pierik | |
| 6,591,802 B1 | | 7/2003 | Pierik | |

FOREIGN PATENT DOCUMENTS

| | | |
|---|---|---|
| EP | 1 039 103 A | 9/2000 |
| WO | WO 98 037 78 A | 1/1998 |

* cited by examiner

*Primary Examiner*—Jaime W. Corrigan
(74) *Attorney, Agent, or Firm*—Patrick M. Griffin

(57) ABSTRACT

A variable valve actuation mechanism includes a control shaft and a rocker arm. A second end of the rocker arm is connected to the control shaft. The rocker arm carries a roller for engaging a cam lobe of an engine camshaft. A link arm is pivotally coupled at a first end thereof to the first end of the rocker arm. An output cam is pivotally coupled to the second end of the link arm, and engages a corresponding cam follower of the engine. A spring biases the roller into contact with the cam lobe and biases the output cam toward a starting angular orientation.

30 Claims, 9 Drawing Sheets

FRAMELESS VARIABLE VALVE ACTUATION MECHANISM

CROSS-REFERENCE TO RELATED APPLICATIONS

This application claims the benefit of U.S. Provisional Patent Application Ser. No. 60/388,531, filed Jun. 13, 2002.

TECHNICAL FIELD

The present invention relates to variable valve actuating mechanisms.

BACKGROUND OF THE INVENTION

Modern internal combustion engines may incorporate advanced throttle control systems, such as, for example, intake valve throttle control systems, to improve fuel economy and performance. Generally, intake valve throttle control systems control the flow of gas and air into and out of the engine cylinders by varying the timing and/or lift (i.e., the valve lift profile) of the cylinder valves in response to engine operating parameters, such as engine load, speed, and driver input. For example, the valve lift profile is varied from a relatively high-lift profile under high-load engine operating conditions to a reduced/lower low-lift profile under engine operating conditions of moderate and low loads.

Intake valve throttle control systems vary the valve lift profile through the use of various mechanical and/or electromechanical configurations, collectively referred to herein as variable valve actuation (VVA) mechanisms. Several examples of particular VVA mechanisms are detailed in commonly-assigned U.S. Pat. No. 5,937,809, the disclosure of which is incorporated herein by reference. Generally, a conventional VVA mechanism includes a rocker arm that is displaced in a generally radial direction by an input cam of a rotating input shaft, such as the engine camshaft. A pair of link arms transfers the displacement of the rocker arm to pivotal oscillation of a pair of output cams relative to the input shaft or camshaft. Each of the output cams is associated with a respective valve. The pivotal oscillation of the output cams is transferred to actuation of the valves by cam followers, such as, for example, direct acting cam followers or roller finger followers.

A desired valve lift profile is obtained by orienting the output cams in a starting or base angular orientation relative to the cam followers and/or the central axis of the input shaft. The starting or base angular orientation of the output cams determines the portion of the lift profile thereof that engages the cam followers as the output cams are pivotally oscillated, and thereby determines the valve lift profile. The starting or base angular orientation of the output cams is set via a control shaft that pivots a pair of frame members which, via the rocker arm and link arms, pivot the output cams to the desired base angular orientation.

The frame members in a conventional VVA mechanism are pivoted relative to a fixed pivot point, typically the centerline of the frame to control shaft coupling. The frame members also establish a fixed pivot length. The fixed pivot length, referred to herein as the ground link, is represented by the linear distance between the input shaft or camshaft central axis and the frame to rocker arm coupling. Since the pivot length or ground link is fixed, pivotal movement of the control shaft results in pure pivotal movement of the frame to rocker arm coupling, i.e., the frame to rocker arm coupling does not move in a direction toward or away from the central axis of the camshaft. The pure pivotal nature of the movement of the frame to rocker arm coupling provides for variation of the amount of lift imparted by the mechanism to the associated valves. However, the pure pivotal nature of the movement of the frame to rocker arm coupling precludes significant control over the timing or phasing of the valve opening event.

The frame members are typically pivotally disposed upon the input shaft, and thus there is a certain amount of friction between the rotating input shaft and the non-rotating frame members pivotally disposed thereon. This friction between the frame members and input shaft reduces the efficiency of the mechanism as well as the engine upon which it is installed, and requires a bearing surface be formed on the engine camshaft or input shaft. Further, the frame members occupy the limited space between the valves of a cylinder. The placement of the frame members within the space between the valves creates size constraints on other engine components which must also be disposed within that space.

Therefore, what is needed in the art is a VVA mechanism that enables control over the timing or phasing of the valve opening event.

Furthermore, what is needed in the art is a VVA mechanism that consumes or occupies substantially less space between the cylinder valves.

Even further, what is needed in the art is a VVA mechanism that substantially reduces and/or eliminates friction between the frame members and the engine camshaft or input shaft.

Moreover, what is needed in the art is a VVA mechanism that eliminates the need for a conventional frame member or members.

SUMMARY OF THE INVENTION

The present invention provides a frameless variable valve actuating mechanism. The present invention includes, in one form thereof, a control shaft and a rocker arm. A second end of the rocker arm is connected to the control shaft. The rocker arm carries a roller for engaging a cam lobe of an engine camshaft. A link arm is pivotally coupled at a first end thereof to the first end of the rocker arm. An output cam is pivotally coupled to the second end of the link arm, and engages a corresponding cam follower of the engine. A spring biases the roller into contact with the cam lobe and biases the output cam toward a starting angular orientation.

An advantage of the present invention is that no frame members are disposed between cylinder valves.

A still further advantage of the present invention is that there are no frame members.

An even further advantage of the present invention is that it phases the valve opening events.

BRIEF DESCRIPTION OF THE DRAWINGS

The above-mentioned and other features and advantages of this invention, and the manner of attaining them, will become apparent and be better understood by reference to the following description of the embodiments of the invention in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DESCRIPTION OF THE PREFERRED EMBODIMENTS

Figure 1:
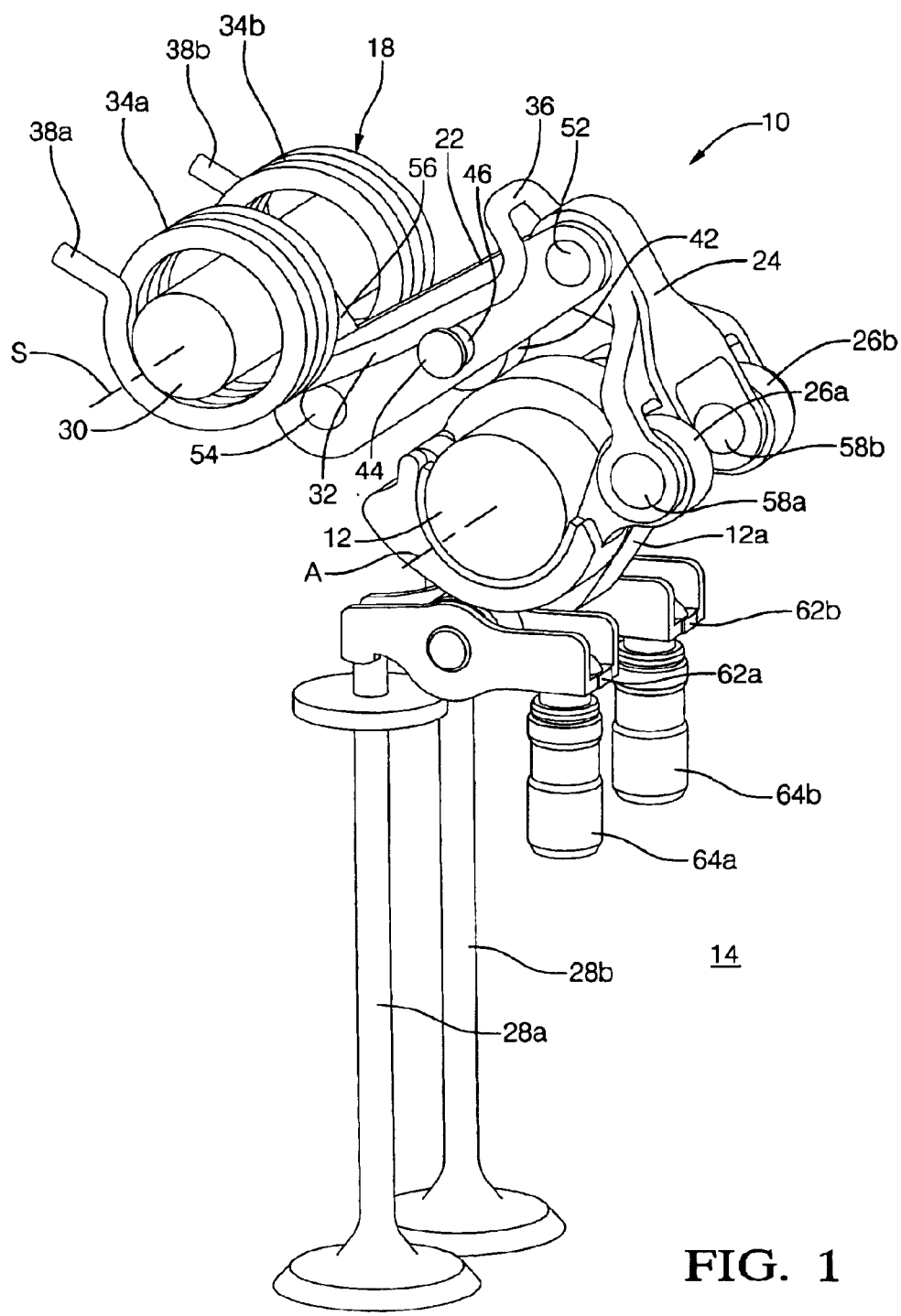
FIG. 1 is a perspective view of a first side of one embodiment of a frameless variable valve actuating (VVA) mechanism of the present invention.
Figure 2:
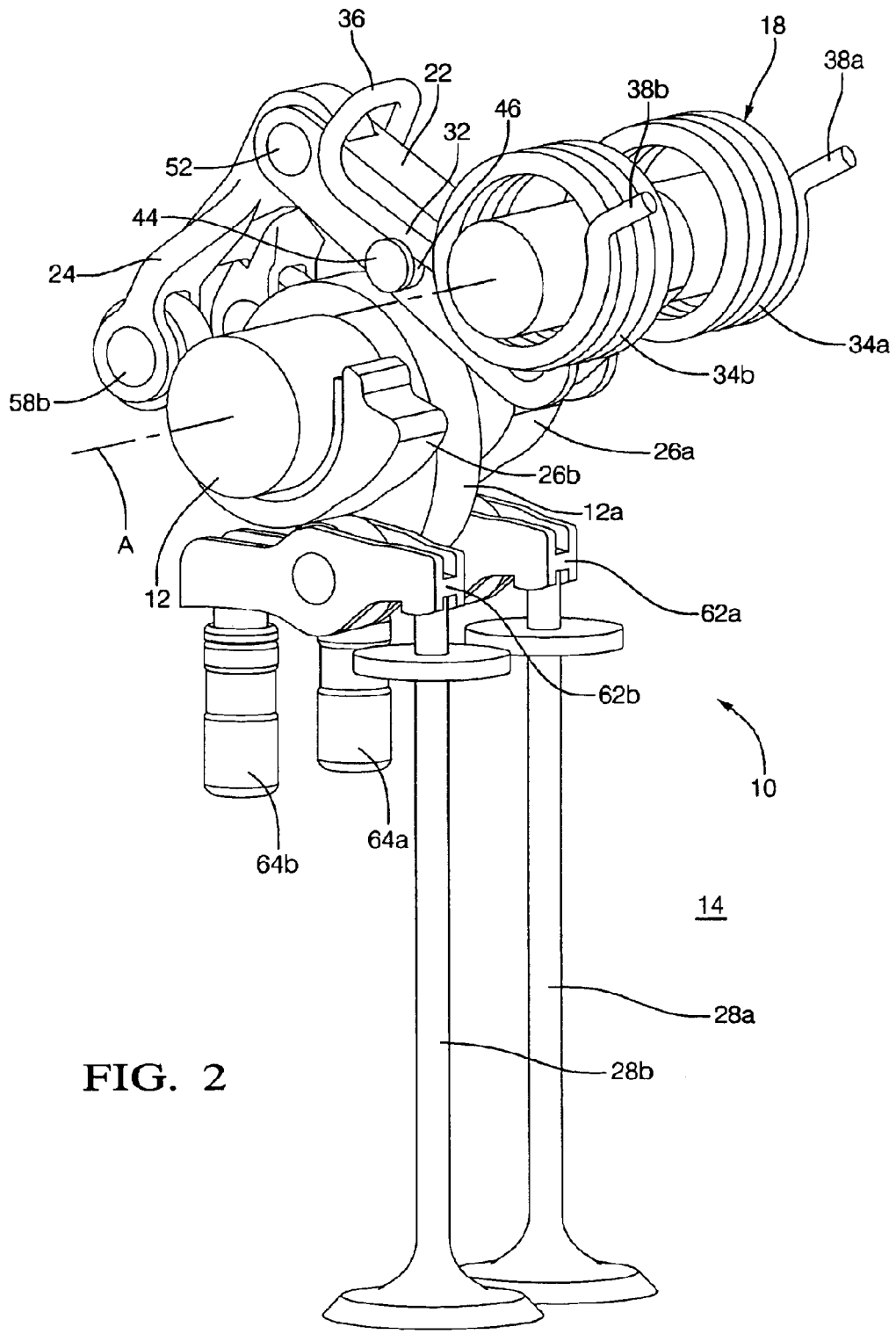
FIG. 2 is a perspective view of the other side of the frameless VVA mechanism of FIG. 1.
Figure 3:
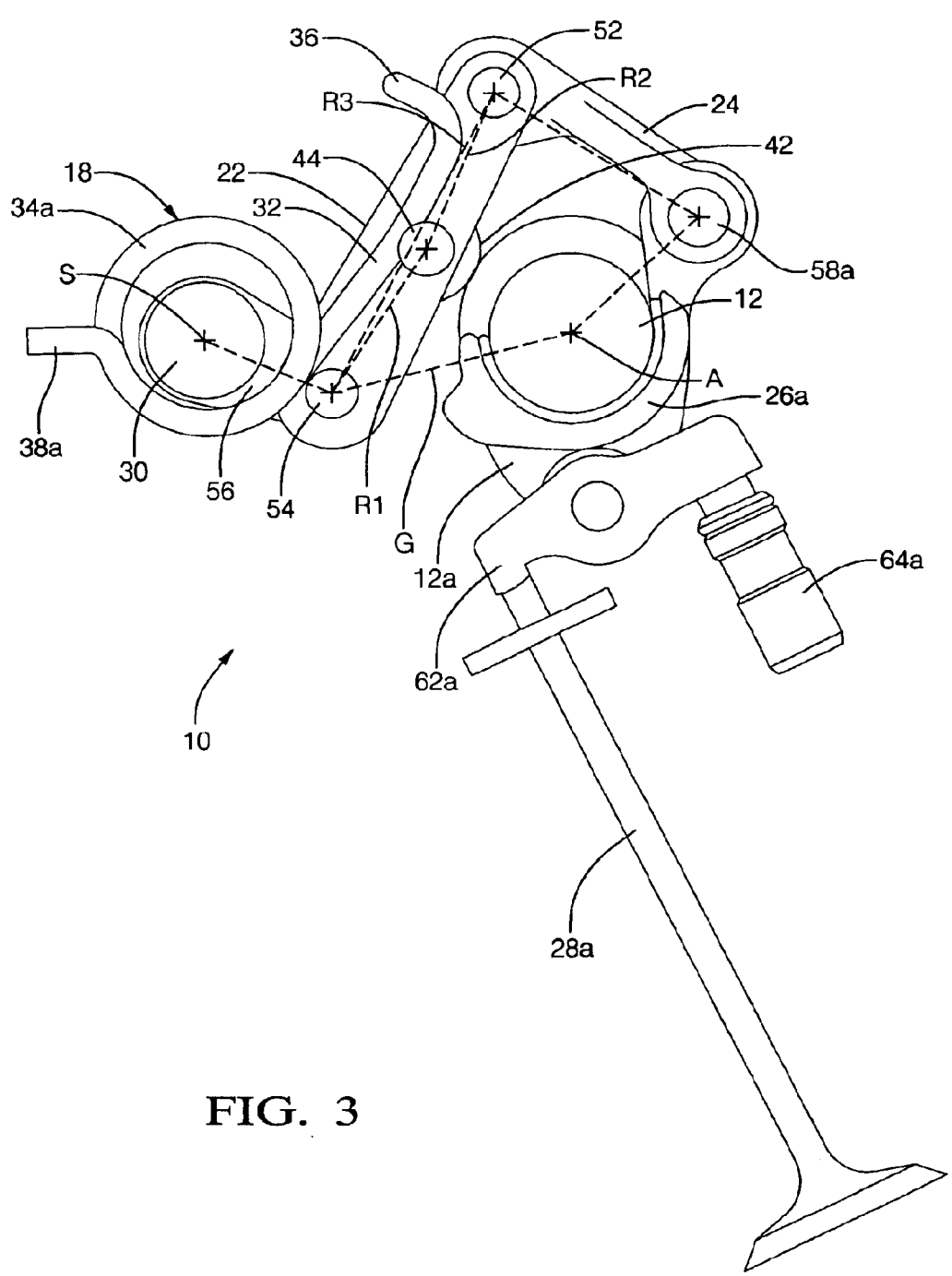
FIG. 3 is an end view of the VVA mechanism of FIG. 1.

Referring now to the drawings, and particularly to FIGS. 1–3, there is shown a variable valve actuating (VVA) mechanism of the present invention. VVA mechanism 10 is operably installed in association with input shaft 12, such as, for example, a camshaft, of engine 14. Input shaft or camshaft 12 (hereinafter referred to as camshaft 12) is driven to rotate by and in timed relation to a crankshaft (not shown) of engine 14. Camshaft 12 rotates relative to central axis A thereof, and includes cam lobe 12a that rotates as substantially one body with camshaft 12.

VVA mechanism 10 includes spring 18, rocker arm 22, link arm 24, and output cams 26a and 26b. Generally, VVA mechanism 10 varies the valve lift of valves 28a and 28b dependent at least in part upon the angular position of control shaft 30. Further, VVA mechanism 10, as will be more particularly described hereinafter, phases the actuation or opening of valves 28a and 28b relative to the angular position of the crankshaft and/or camshaft 12 and dependent at least in part upon the amount of lift being imparted thereto.

Spring 18 is configured as a double helical torsion spring, and includes arm portion 32 that extends radially from coil portions 34a and 34b. Coil portions 34a and 34b are coiled around control shaft 30 on opposite sides of rocker arm 22, and arm portion 32 engages rocker arm 22 as will be more particularly described hereinafter. Spring 18 has a first end 36 that crosses over rocker arm 22. Each of coil portions 34a and 34b include radially extending tabs 38a and 38b, respectively, each of which are, in use, disposed in abutting engagement with a cylinder head (not shown) of the engine cylinder (not shown) of engine 14 with which VVA mechanism 10 is associated. Generally, spring 18 biases rocker arm 22 into engagement with cam lobe 12a of camshaft 12, and thereby biases output cams 26a and 26b toward a predetermined or starting angular orientation as established by the angular orientation of control shaft 30.

Rocker arm 22 carries roller 42 that engages cam lobe 12a of camshaft 12. More particularly, roller 42 is coupled to rocker arm 22 by rocker stud 44. Rocker stud 44 extends through a central bore (not shown) of roller 42 and through opposing bores (not shown or referenced) formed in each side of rocker arm 22. Rocker stud 44 forms spring-engaging features 46, such as, for example, a groove or recess proximate to a flange or head, at each end thereof. Rocker arm 22 is pivotally coupled at a first end (not referenced) thereof to link arm 24 by coupler 52, such as, for example, a pin. At the second end (not referenced) thereof rocker arm 22 is coupled by a coupler 54, such as, for example, a pin, to control shaft arm 56.

Link arm 24 at the end thereof that is opposite rocker arm 22 is pivotally coupled to output cams 26a and 26b by couplers 58a and 58b, respectively, such as, for example, pins. Thus, pivotal oscillation of link arm 24 is transferred to a corresponding pivotal oscillation of output cams 26a and 26b.

Output cams 26a and 26b engage respective cam followers 62a and 62b. The pivotal oscillation of output cams 26a and 26b is transferred to pivotal motion of respective cam followers 62a and 62b, such as, for example, direct acting cam followers or roller finger followers, relative to lash adjusters 64a and 64b, respectively. The pivotal motion of cam followers 62a and 62b, in turn, reciprocate valves 28a and 28b, respectively, of engine 14 thereby opening and closing the valves.

Output cams 26a and 26b are pivotally disposed upon camshaft 12. More particularly, output cams 26a and 26b are configured as partial wrap output cam assemblies including respective partial wrap bearing inserts (not referenced). Output cams 26a and 26b are retained upon camshaft 12 by a snap fit between the outer surface (not referenced) of camshaft 12 and their respective bearing inserts.

Control shaft 30 is an elongate shaft member having central axis S. Control shaft 30 includes control shaft arm 56 that is affixed to and/or integral with control shaft 30. Control shaft arm 56 extends in a generally radial direction from and rotates as substantially one body with control shaft 30. Control shaft arm 56 is pivotally coupled by coupler 54, such as, for example, a pin, to the second end (not referenced) of rocker arm 22.

In use, and generally, control shaft 30 is placed or pivoted into an angular orientation relative to central axis S thereof by an actuator (not shown) to thereby orient VVA mechanism 10 such that valves 28a and 28b are actuated or lifted by a desired amount of lift. The pivoting of control shaft 30 also results in VVA mechanism 10 desirably phasing the valve opening event as a function of valve lift.

More particularly, in regard to valve lift, the pivoting of control shaft 30 establishes (via control shaft arm 56, rocker arm 22 and link arm 24) the angular orientation of output cams 26a and 26b relative to central axis A and, thereby, relative to cam followers 62a and 62b. The angular orientation of output cams 26a and 26b determines the portion of the lift profile thereof that engages cam followers 62a and 62b as output cams 26a and 26b pivotally oscillate. The portion of the lift profile of output cams 26a and 26b that engages cam followers 62a and 62b, respectively, determines the amount of lift imparted to valves 28a, 28b. Thus, the angular orientation of output cams 26a and 26b relative to central axis A and relative to cam followers 62a and 62b as established by the angular orientation of control shaft 30 determines the amount of lift imparted to valves 28a and 28b.

Placing control shaft 30 into a particular angular orientation relative to central axis S also provides desirable phasing of the angular orientation at which the camshaft opens valves 28a and 28b at a given amount of valve lift relative to other and different amounts of valve lift. More particularly, as control shaft 30 is pivoted into a predetermined orientation to establish a desired amount of valve lift, control shaft arm 56 and coupler 54 transfer the pivotal movement of control shaft 30 to rocker arm 22. Thus, rocker arm 22 is pivoted into a corresponding position relative to central axis A, and roller 42 carried by rocker arm 22 is pivoted into a corresponding angular orientation relative to input cam lobe 12a (i.e., the rotational separation of roller 42 and input cam lobe 12a is adjusted). Further, as control shaft 30 is pivoted into a particular angular orientation output cams 26a and 26b are also pivoted into an angular orientation relative to cam followers 62a, 62b, respectively. The adjustment of the orientations and/or positions of the above-described components of VVA mechanism 10 combine to provide the desirable phasing of the valve opening event as a function of valve lift.

Dependent at least in part upon the angular orientation of control shaft 30 relative to central axis S upon commencement of the pivotal movement thereof and/or the angular range through which control shaft 30 is pivoted, the resulting motion of coupler 54 includes at least one of a radially-directed component and/or a tangentially-directed component relative to the outer surface of input cam lobe 12a. The resulting motion of coupler 54 will be directed generally toward and/or generally away from central axis A. Thus, coupler 54 undergoes a complex two-dimensional movement that varies the effective length of the kinematic ground link formed between coupler 54 and central axis A of camshaft 12. This complex two-dimensional movement of coupler 54 also contributes to the desirable phasing of the valve opening event as a function of valve lift.

Referring to FIG. 3, the kinematic linkages of the VVA mechanism of the present invention are shown. Ground link G is represented by the dashed line between central axis A of camshaft 12 and the centerline (not referenced) of coupler 54. Kinematic link R1 is represented by the dashed line between the centerline of coupler 54 and the centerline (not referenced) of rocker stud 44, and kinematic link R2 is represented by the dashed line between the centerline of rocker stud 44 and the centerline (not referenced) of coupler 52. Similarly, kinematic link R3 is represented by the dashed line between the centerlines of coupler 52 and coupler 54. As shown in FIG. 3, VVA mechanism 10 is positioned to impart a maximum or substantially maximum amount of lift, such as, for example, approximately 10 mm, to valves 28a and 28b.

In order to place VVA mechanism 10 in this maximum or substantially maximum lift mode, control shaft 30 is placed in a minimum or substantially minimum counterclockwise angular orientation (shown in FIG. 3). The substantially minimum counterclockwise angular orientation of control shaft 30 is transferred via control shaft arm 56, rocker arm 22, and link arm 24 to dispose substantially the entire lift portion of the lift profile of output cams 26a and 26b within the fixed oscillatory range thereof relative to cam followers 62a and 62b, respectively. Thus, cam followers 62a and 62b are engaged by substantially the entire lift portion of the lift profile of output cams 26a and 26b, respectively, and valves 28a and 28b are actuated or lifted by a maximum or substantially maximum amount.

It is also seen that with VVA mechanism 10 in the position depicted in FIG. 3, i.e., the maximum or substantially maximum lift position, roller 42 of rocker arm 22 is disposed at a substantially maximum counterclockwise position relative to cam lobe 12a. Since camshaft 12 rotates in a counterclockwise direction, roller 42 is rotationally separated from cam lobe 12a by a relatively substantial distance relative to the separation between roller 42 and cam lobe 12a in a mid-value lift orientation that provides a mid-value of valve lift, such as, for example, approximately 3 to 8 millimeters, as will be more particularly described hereinafter. Roller 42 is therefore engaged by cam lobe 12a at an angle of crankshaft/camshaft rotation that is retarded relative to the angle at which roller 42 is engaged by cam lobe 12a when VVA mechanism 10 is disposed in the mid-lift position. Thus, the opening of valves 28a and 28b at maximum or substantially maximum amounts of lift is retarded, i.e., occurs at a relatively large angle of crankshaft or camshaft rotation, relative to the valve opening event at mid-values of lift.

As control shaft 30 is pivoted in a counterclockwise direction from the position depicted in FIG. 3, VVA mechanism 10 is adjusted to increasingly reduce valve lift. Further, as control shaft 30 is pivoted in a counterclockwise direction from the position depicted in FIG. 3, the valve opening events are first advanced and then retarded relative to the valve opening event that occurs with VVA mechanism 10 in the maximum or substantially maximum lift position.

More particularly, as control shaft 30 is pivoted in a counterclockwise direction from the position depicted in FIG. 3, output cams 26a and 26b are pivoted in a clockwise direction. Thus, a larger portion of the base circle/low lift portion of the lift profile of output cams 26a and 26b will engage cam followers 62a and 62b as output cams 26a and 26b are pivotally oscillated, and the amount of lift imparted to valves 28a and 28b is increasingly reduced as control shaft 30 is pivoted in the counterclockwise direction from the position depicted in FIG. 3. This reduction in valve lift progresses in a substantially continuous and uninterrupted manner as control shaft 30 is pivoted in the counterclockwise direction from the position depicted in FIG. 3, and at which valves 28a and 28b are maximally lifted, and through to a position wherein control shaft 30 has been pivoted to a maximum counterclockwise orientation in which valves 28a and 28b undergo a minimum lift, such as, for example, 0.5 mm. Pivoting control shaft 30 in a clockwise position from the maximum counterclockwise orientation reverses the process, i.e., valve lift is increased from minimum to maximum lift.

Figure 4:
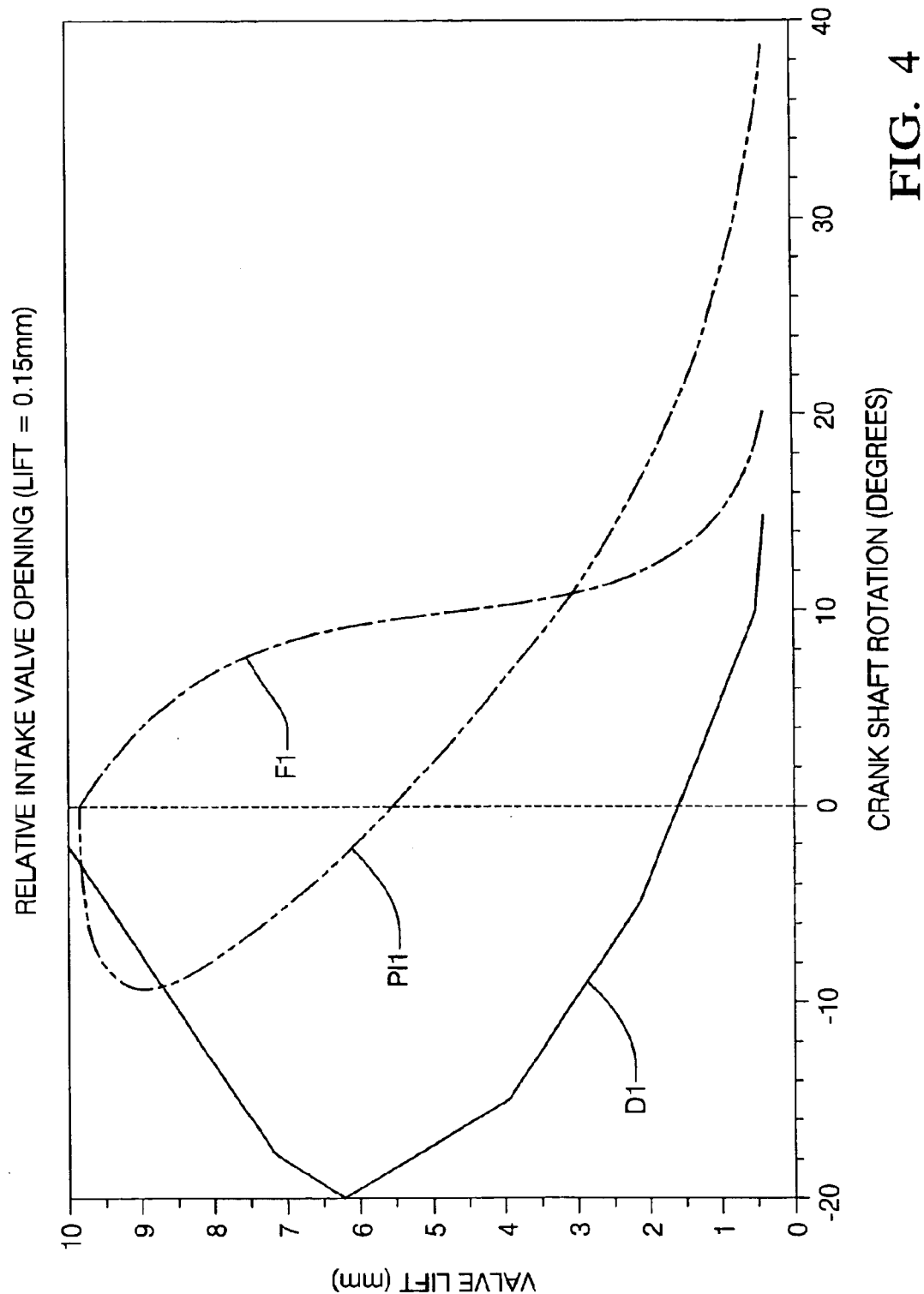
FIG. 4 is a plot of valve lift versus crank shaft rotation of an ideal VVA mechanism, a conventional frame-based VVA mechanism and the VVA mechanism of the present invention, and shows the relative valve opening of those mechanisms at a fixed valve lift.

As stated above, and as best shown in FIG. 4, the pivoting of control shaft 30 in a counterclockwise direction from the maximum or substantially maximum lift orientation depicted in FIG. 3, in addition to continuously decreasing the amount of valve lift as detailed above, at first advances and then retards the crankshaft or camshaft angle at which the valve opening event occurs relative to the crankshaft or camshaft angle at which valves 28a and 28b open during a maximum or substantially maximum valve lift event.

More particularly, as control shaft 30 is pivoted in a counterclockwise direction from the orientation depicted in FIG. 3 (i.e., the maximum lift position) the amount of lift imparted to valves 28a and 28b is continuously reduced and the crankshaft angle at which valves 28a and 28b open is increasingly and continuously advanced until a mid-value lift position is reached wherein valve opening is maximally advanced. Continued counterclockwise pivoting of control shaft 30 beyond this mid-value lift/maximally advanced orientation continues to reduce the height by which valves 28a and 28b are lifted and results in a decreasing advancement, or relative retarding, of the valve opening event relative to the crankshaft angle at which maximally advanced valve opening occurs.

This desirable phasing of the crankshaft/camshaft angle at which the valve opening event occurs is, as discussed above, due at least in part to the complex movement and orientation of coupling 54 relative to central axis A, the proximity of roller 42 relative to cam lobe 12a, and the portion of the lift profile of output cams 26a and 26b that engage cam followers 62a, 62b, respectively, during pivotal oscillation thereof. All of the aforementioned characteristics are established by the angular orientation of control shaft 30.

FIG. 4 plots intake valve opening versus crankshaft rotation as a function of valve lift for three different situations, and graphically illustrates the foregoing discussion. The desired plot of intake valve opening versus crank shaft rotation for the various values of valve lift is represented by curve D1, the same plot for a conventional frame-based VVA mechanism is represented by curve F1, and the same plot for VVA mechanism 10 is represented by curve PI1.

The desired curve D1, obtained through combustion modeling and intended to emphasis fuel economy, shows that it is desirable to increasingly advance the crankshaft angle at which the valve opening event occurs as lifts decrease from high- to mid-values of valve lifts, such as, for example, from approximately 10 to approximately 6 mm, and to decreasingly advance, or retard, the crankshaft angle at which the valve opening event occurs as lifts further decrease below the mid-values of valve lifts.

Figure 5:
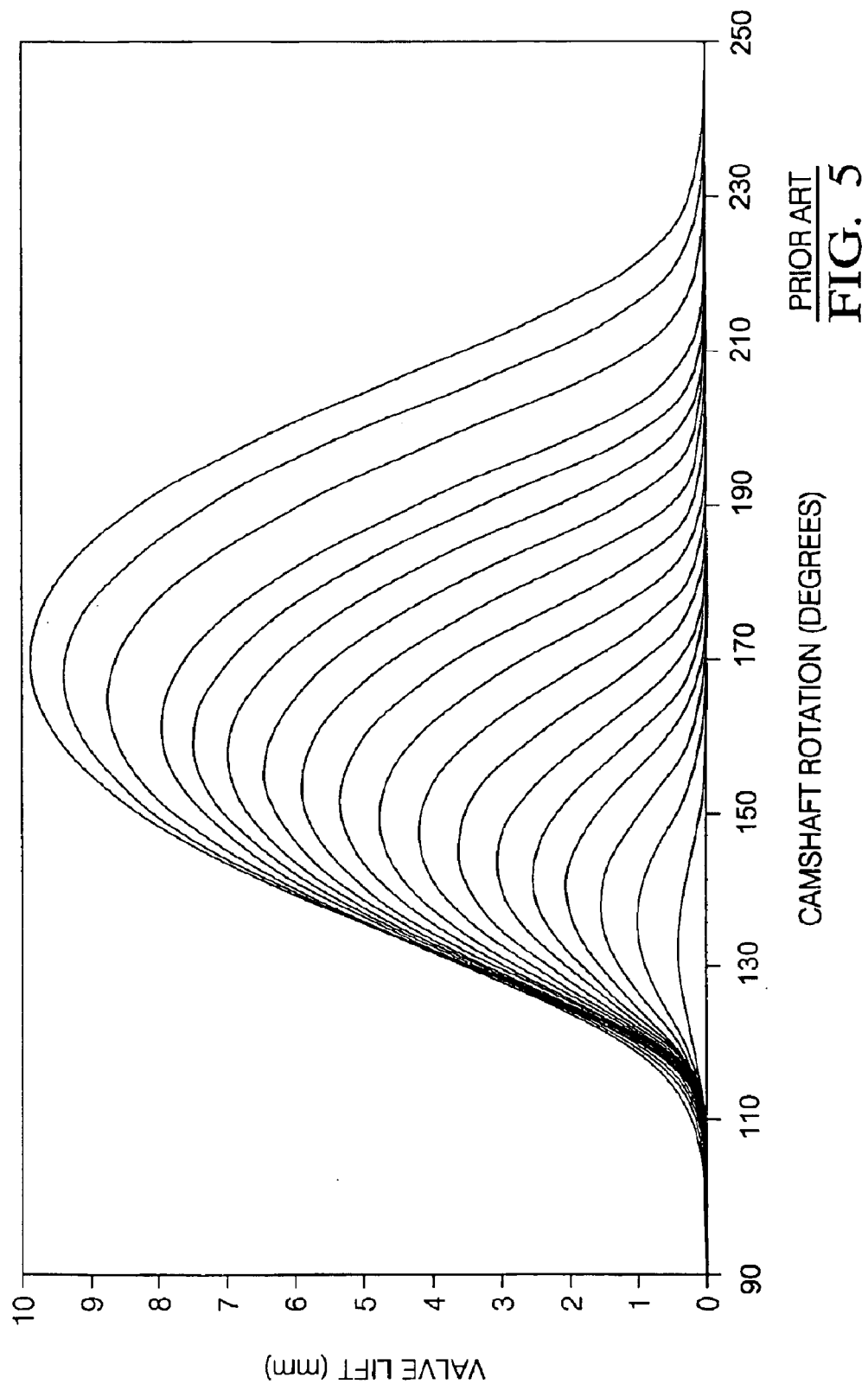
FIG. 5 is a plot of a family of valve lift curves, i.e., valve lift versus camshaft rotation, obtained by a conventional frame-based VVA mechanism.

The characteristic, as also shown in FIG. 5, of the conventional frame-based VVA mechanism F1 shows that the crankshaft angle at which the mid-level valve lifts occur is not advanced, but is in fact somewhat retarded, relative to the high-lift valve events, and is not significantly advanced relative to the low-lift valve events. Therefore, an engine having a conventional VVA mechanism requires additional and/or other measures to approach the phasing represented by desired curve D1.

The present invention approaches the characteristics of desired curve D1. As shown in curve PI1 (FIG. 4), VVA mechanism 10 advances the crankshaft angle at which the valves open for high- and mid-lift events, and retards and/or decreasingly advances the crankshaft angle at which the valves open for lower lift events.

Figure 6:
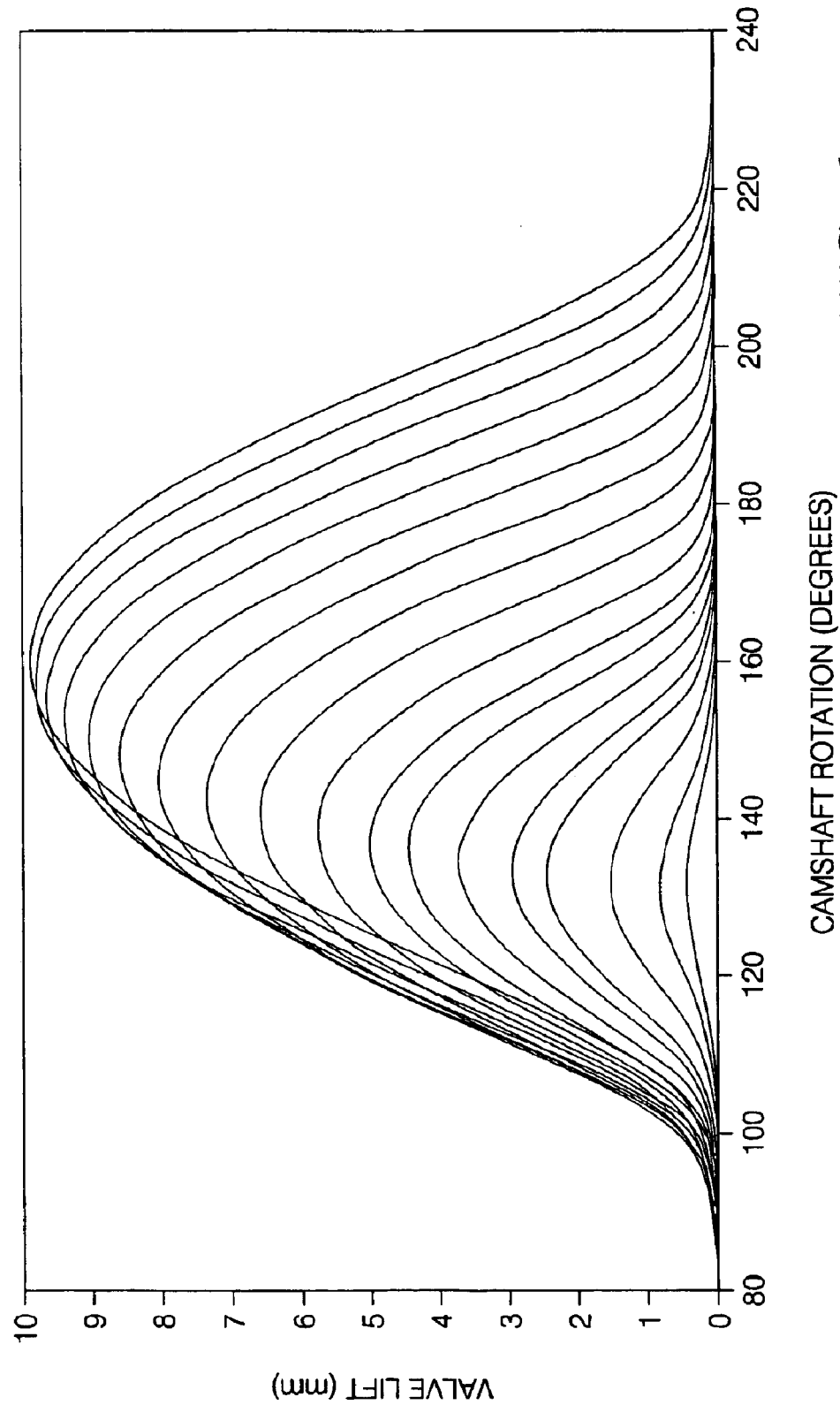
FIG. 6 is a plot of a family of valve lift curves, i.e., valve lift versus camshaft rotation, obtained by the VVA mechanism of the present invention.

In contrast to a conventional frame-based VVA mechanism and similarly to the ideal characteristic D1, FIG. 6 shows that VVA mechanism 10 first advances and then retards the crankshaft/camshaft angle at which the valve opening event occurs as valve lift is decreased from a maximum value to a minimum valve. More particularly, FIG. 4 shows that the camshaft/crankshaft angle at which the valve opening event occurs is increasingly advanced from a mid-lift value of from approximately 5 to approximately 6 mm that is only slightly, if at all, advanced to a lift of approximately 9 mm that is advanced by approximately ten crankshaft degrees of rotation. Conversely, the camshaft/crankshaft angle at which the valve opening event occurs is decreasingly advanced, or increasingly retarded, from a mid-lift value of from approximately 5 to approximately 6 mm that is only slightly, if at all, retarded to a minimum lift of approximately 0.5 mm that is retarded by approximately 38 crankshaft degrees of rotation. Thus, VVA mechanism 10 provides for beneficial and desirable phasing of the valve opening event relative to camshaft/crankshaft angle as a function of valve lift that approaches the ideal characteristic D1, and which phasing is not performed by prior art variable valve actuation mechanisms.

In the embodiment shown, spring 18 engages rocker arm 22 at rocker stud 44, which also acts to couple roller 42 to rocker arm 22. However, the present invention can be alternately configured, such as, for example, having spring 18 engage rocker arm 22 at coupler 52 and/or any other position along the length of rocker arm 22 that provides a desired moment arm length through which spring 18 acts, and thus a desired spring force exerted upon rocker arm 22 to thereby return output cams 26a, 26b to a preset or desired angular starting orientation as determined by the angular orientation of control shaft 30.

Figure 7:
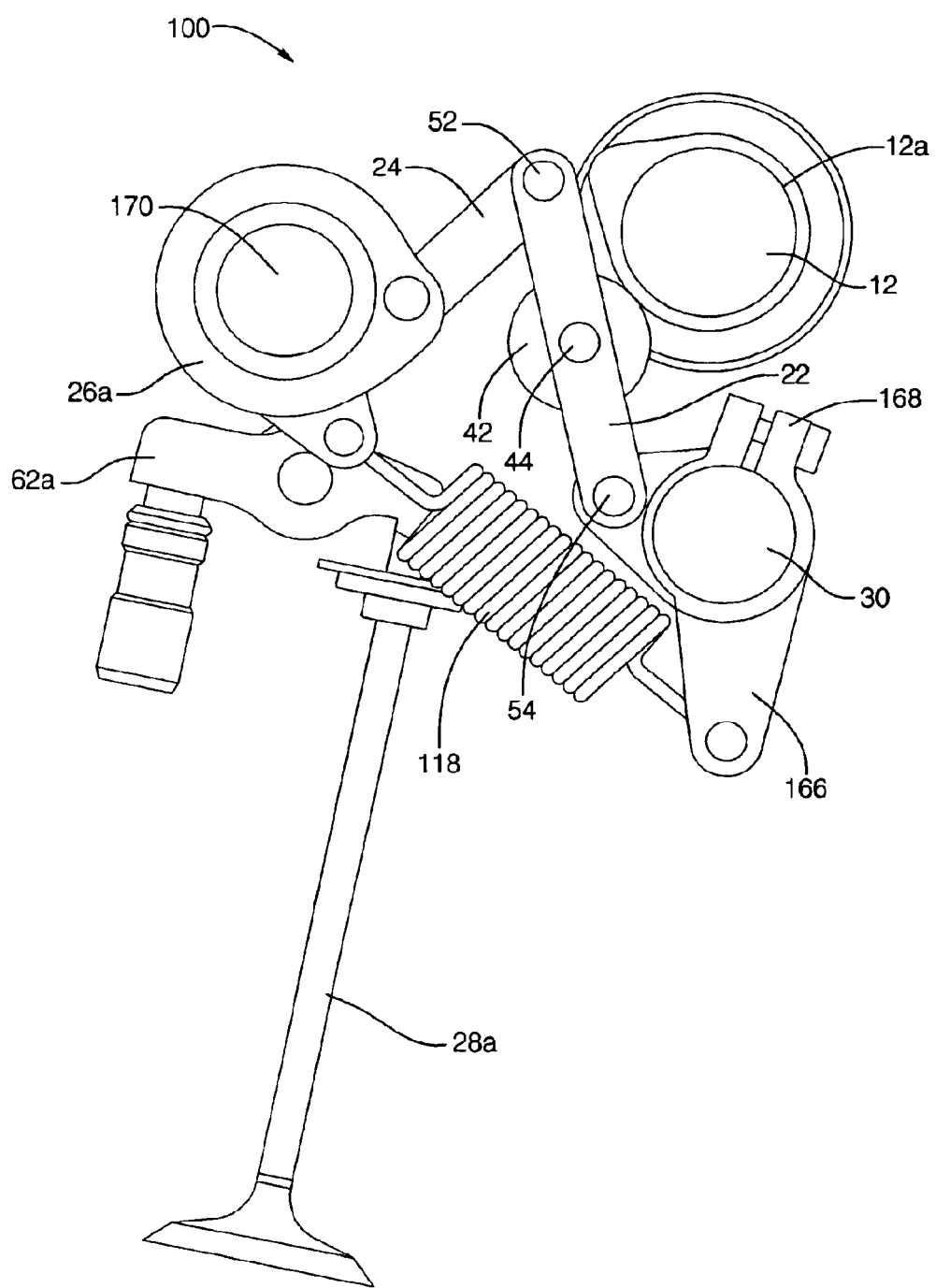
FIG. 7 is a perspective view of a first side of a second embodiment of a frameless variable valve actuating (VVA) mechanism of the present invention.

Similarly, in the embodiment shown spring 18 is configured as a double helical torsion spring that is coiled around control shaft 30. However, it is to be understood that spring 18 can be alternately configured, such as, for example, a pair of single-coil springs. Such an embodiment of a variable valve mechanism of the present invention is shown in FIG. 7, wherein the same reference characters are used to indicate component parts that correspond to the component parts of VVA mechanism 10. It should be noted that, in the interest of clarity, only one side of VVA mechanism 100 is shown in FIG. 7.

VVA mechanism 100, as shown in FIG. 7, includes two springs 118 (only one shown). In VVA mechanism 100, however, springs 118 are single extension springs rather than the bent torsion spring 18 of VVA mechanism 10. Each of springs 118 have a first end attached to a corresponding spring arm 166 extending from and/or integral with control shaft 30. Alternatively, spring arm 166 is integral with and/or extends from control shaft clamp 168, which is itself affixed to control shaft 30. Each spring 118 has a second end attached to a corresponding one of output cams 26a and 26b (only output cam 26a is shown). Springs 118 exert a sufficient force upon output cams 26a and 26b to return them to a preset or desired angular starting orientation as determined by the angular orientation of control shaft 30. Springs 118 also exert, via output cams 26a, 26b and link arm 24, a force tending to maintain roller 42 in contact with input cam lobe 12a.

Figure 8:
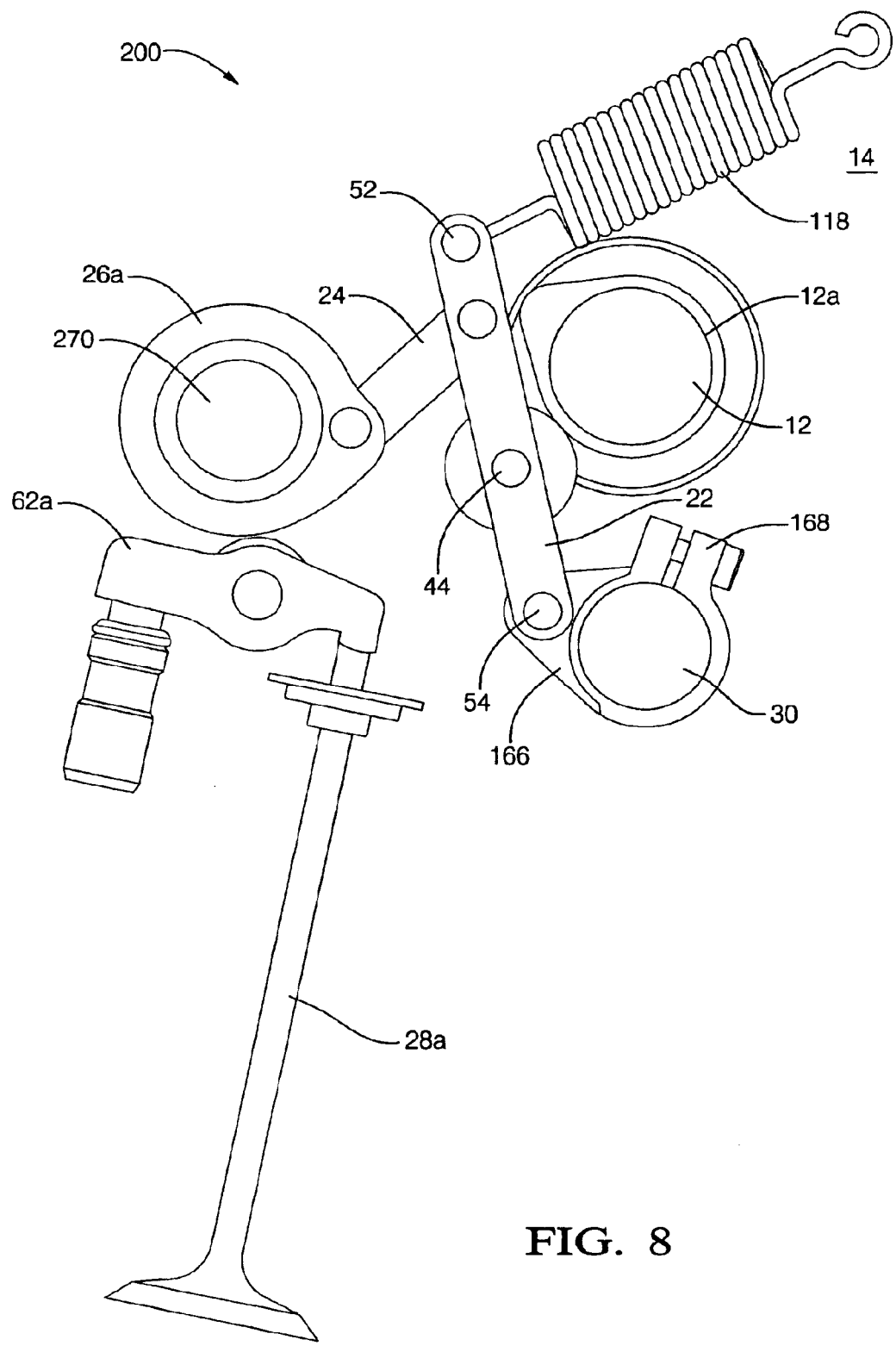
FIG. 8 is a perspective view of a first side of a third embodiment of a frameless variable valve actuating (VVA) mechanism of the present invention.

Yet another embodiment of a variable valve mechanism of the present invention is shown in FIG. 8. It should be noted that, in the interest of clarity, only one side of VVA mechanism 200 is shown in FIG. 8. VVA mechanism 200 includes spring 118 having a first end attached to engine 14, such as, for example, a cylinder head thereof, and a second end attached to coupler 52.

In contrast to VVA mechanism 10 wherein output cams 26a and 26b are pivotally disposed upon engine camshaft 12, output cams 26a and 26b of VVA mechanisms 100 and 200 are mounted on output camshafts 170 and 270, respectively, each of which are substantially parallel relative to and spaced apart from engine camshaft 12.

Figure 9:
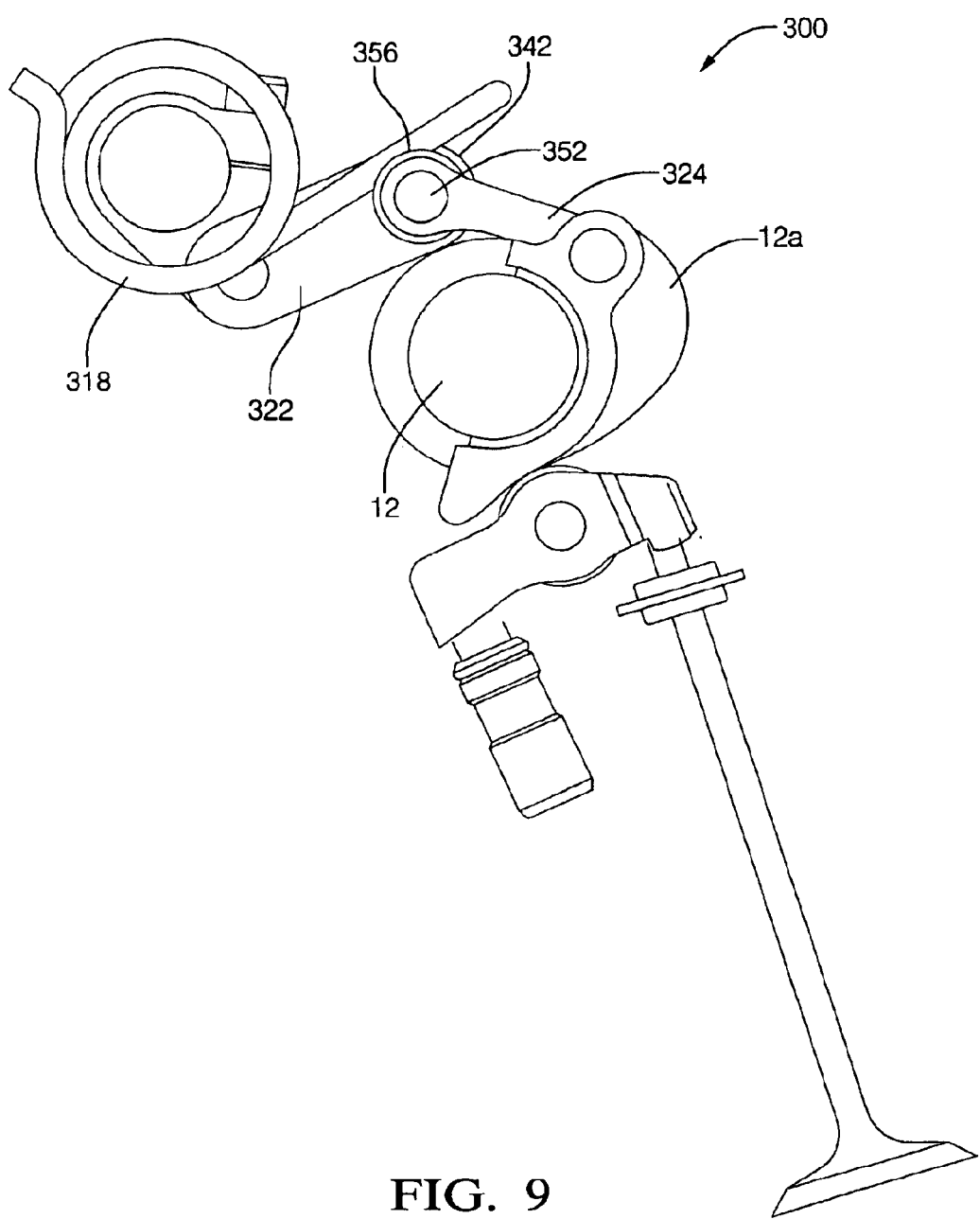
FIG. 9 is a perspective view of a first side of a fourth embodiment of a frameless variable valve actuating (VVA) mechanism of the present invention.

A still further embodiment of a variable valve mechanism of the present invention is shown in FIG. 9. It should be noted that, in the interest of clarity, only one side of VVA mechanism 300 is shown in FIG. 9. VVA mechanism 300 includes spring 318, rocker arm 322, link arm 324, roller 342, and rocker-to-link arm coupler 352.

Spring 318 is configured substantially similar to spring 18 of VVA mechanism 10. However, spring 318 engages spring-accepting feature 356 of coupler 352. Coupler 352 pivotally couples roller 342 to VVA mechanism 300 at the interface of rocker arm 322 and link arm 324. Further, coupler 352 pivotally couples rocker arm 322 together with link arm 324. Spring 318 engages spring-accepting feature 356, such as, for example, a bushing surrounding coupler 352 and having indentures or grooves, and acts to bias roller 342 into contact with input cam lobe 12a. Thus, it should be noted that coupler 352 and spring-engaging feature 356 combine into one location the functions served in different locations by rocker stud 44 and coupler 42 of VVA mechanism 10.

While this invention has been described as having a preferred design, the present invention can be further modified within the spirit and scope of this disclosure. This application is therefore intended to cover any variations, uses, or adaptations of the present invention using the general principles disclosed herein. Further, this application is intended to cover such departures from the present disclosure as come within the known or customary practice in the art to which this invention pertains and which fall within the limits of the appended claims.

What is claimed:

1. A variable valve actuation mechanism for use with an internal combustion engine, said engine including a rotary camshaft having a cam lobe, said mechanism comprising:
   a control shaft substantially parallel relative to and spaced apart from said camshaft;
   a rocker arm having a first end and a second end, said rocker arm carrying a roller, said roller engaging the cam lobe, said rocker arm pivotally coupled at said second end thereof to said control shaft;
   a link arm having a first end and a second end, said link arm being pivotally coupled at said first end thereof to said first end of said rocker arm;
   at least one output cam pivotally coupled to said second end of said link arm, each said at least one output cam configured for engaging a corresponding cam follower of the engine; and
   a spring configured for biasing said roller into contact with the cam lobe and for biasing said at least one output cam toward a starting angular orientation.

2. The mechanism of claim 1, further comprising a control shaft arm, said control shaft arm being one of affixed to and integral with said control shaft, said second end of said rocker arm being pivotally coupled to said control shaft arm.

3. The mechanism of claim 2, further comprising an output camshaft, said output camshaft being substantially parallel relative to and spaced apart from the rotary camshaft, said at least one output cam being pivotally disposed upon said output camshaft.

4. The mechanism of claim 3, wherein said spring comprises an extension spring corresponding to each said at least one output cam, said spring having a first end connected to said control shaft to thereby ground said spring, a second end of said spring connected to said at least one output cam.

5. The mechanism of claim 4, further comprising a control shaft clamp affixed to said control shaft, said first end of said spring being connected to said shaft clamp.

6. The mechanism of claim 3, wherein said spring comprises an extension spring corresponding to each said at least one output cam, said spring having a first end and a second end, said first end configured for engaging a substantially stationary surface of the engine to thereby ground said spring, said second end connected to said rocker arm.

7. The mechanism of claim 6, wherein said spring is connected to said second end of said rocker arm.

8. The mechanism of claim 1, wherein said at least one output cam is configured for being pivotally disposed upon the rotary camshaft of the engine.

9. The mechanism of claim 8, wherein said at least one output cam comprises first and second output cams, said output cams being pivotally coupled to respective and opposite sides of said second end of said link arm, each of said output cams configured for engaging a corresponding cam follower of the engine.

10. The mechanism of claim 8, where said spring comprises a helical torsion spring, said spring having a first and second coil, said first coil surrounding a portion of said control shaft on a first side of said control shaft arm, said second coil surrounding a portion of said control shaft on a second side of said control shaft arm.

11. The mechanism of claim 10, wherein said spring further comprises a respective tab extending generally away from each of said first and second coils, said tabs configured for engaging a substantially stationary surface of the engine to thereby ground each of said coils.

12. The mechanism of claim 11, wherein said spring further comprises an arm portion extending from said first and second coils, said arm portion engaging one of directly and indirectly said rocker arm.

13. The mechanism of claim 12, further comprising a rocker stud coupling said roller to said rocker arm, said arm portion of said spring engaging said rocker stud.

14. The mechanism of claim 13, wherein said rocker stud is disposed between said first and second ends of said rocker arm.

15. The mechanism of claim 13, wherein said rocker stud comprises a coupler and a spring-engaging feature, said coupler pivotally coupling together said first end of said rocker arm and said first end of said link arm, said spring engaging said spring-engaging feature.

16. An internal combustion engine having at least one valve, said engine comprising:
   a rotary camshaft having at least one cam lobe;
   a variable valve actuation mechanism including a control shaft, said control shaft being substantially parallel relative to and spaced apart from said camshaft, a rocker arm having a first end and a second end, said rocker arm carrying a roller, said roller engaging said cam lobe, said rocker arm pivotally connected at said second end thereof to said control shaft, a link arm having a first end and a second end, said link arm being pivotally coupled at said first end thereof to said first end of said rocker arm, at least one output cam pivotally coupled to said second end of said link arm, and a spring configured for biasing said roller into contact with the cam lobe and for biasing said at least one output cam toward a starting angular orientation; and
   at least one cam follower, each said at least one cam follower engaging a corresponding one of said at least one output cam.

17. The mechanism of claim 16, further comprising a control shaft arm, said control shaft arm being one of affixed to and integral with said control shaft, said second end of said rocker arm pivotally coupled to said control shaft arm.

18. The mechanism of claim 17, further comprising an output camshaft, said output camshaft being substantially parallel relative to and spaced apart from the engine camshaft, said at least one output cam being pivotally disposed upon said output camshaft.

19. The mechanism of claim 18, wherein said spring comprises an extension spring corresponding to each of said at least one output cams, each said spring having a first end connected to said control shaft to thereby ground said spring, a second end of said spring connected to a corresponding one of said at least one output cam.

20. The mechanism of claim 19, further comprising a control shaft clamp affixed to said control shaft, said first end of said spring being connected to said shaft clamp.

21. The mechanism of claim 18, wherein said spring comprises a coil spring having a first end and a second end, said first end configured for engaging a substantially stationary surface of the engine to thereby ground said spring, said second end connected to said rocker arm.

22. The mechanism of claim 21, wherein said spring is connected to said second end of said rocker arm.

23. The mechanism of claim 16, wherein said at least one output cam is configured for being pivotally mounted upon the rotary camshaft of the engine.

24. The mechanism of claim 23, where said spring comprises a helical torsion spring, said spring having a first and second coil, said first coil surrounding a portion of said control shaft on a first side of said rocker arm, said second coil surrounding a portion of said control shaft on a second side of said rocker arm.

25. The mechanism of claim 24, wherein said spring further comprises a respective tab extending in a generally radial direction from each of said first and second coils, said tabs configured for engaging a substantially stationary surface of the engine to thereby ground each of said coils.

26. The mechanism of claim 25, wherein said spring further comprises an arm portion extending from said first and second coils, said arm portion engaging one of directly and indirectly said rocker arm.

27. The mechanism of claim 26, further comprising a rocker stud coupling said roller to said rocker arm, said arm portion of said spring engaging said rocker stud.

28. The mechanism of claim 27, wherein said rocker stud is disposed between said first and second ends of said rocker arm.

29. The mechanism of claim 27, wherein said rocker stud comprises a coupler and a spring-engaging feature, said coupler pivotally coupling together said first end of said rocker arm and said first end of said link arm, said spring engaging said spring-engaging feature.

30. A motor vehicle having an internal combustion engine, comprising:

a rotary camshaft having at least one cam lobe;

a variable valve actuation mechanism including a control shaft, said control shaft being substantially parallel relative to and spaced apart from said camshaft, a rocker arm having a first end and a second end, said rocker arm carrying a roller, said roller engaging said cam lobe, said rocker arm pivotally connected at said second end thereof to said control shaft, a link arm having a first end and a second end, said link arm being pivotally coupled at said first end thereof to said first end of said rocker arm, at least one output cam pivotally coupled to said second end of said link arm, and a spring configured for biasing said roller into contact with the cam lobe and for biasing said at least one output cam toward a starting angular orientation; and at least one cam follower, each said at least one cam follower engaging a corresponding one of said at least one output cam.

\* \* \* \* \*